US012674063B2

(12) United States Patent
Markou et al.

(10) Patent No.: US 12,674,063 B2
(45) Date of Patent: Jul. 7, 2026

(54) ELECTROCOATING COMPOSITION

(71) Applicant: AXALTA COATING SYSTEMS IP CO., LLC, Wilmington, DE (US)

(72) Inventors: Konstantinos Markou, Cologne (DE); Nevzat Öztürk, Wuppertal (DE); Thomas Huesmann, Solingen Gräfrath (DE)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 965 days.

(21) Appl. No.: 17/804,345

(22) Filed: May 27, 2022

(65) Prior Publication Data

US 2022/0380610 A1      Dec. 1, 2022

Related U.S. Application Data

(60) Provisional application No. 63/194,261, filed on May 28, 2021.

(51) Int. Cl.
*C09D 5/44* (2006.01)
*C25D 13/04* (2006.01)

(52) U.S. Cl.
CPC ........... *C09D 5/4438* (2013.01); *C25D 13/04* (2013.01); *C08K 2201/019* (2013.01)

(58) Field of Classification Search
None
See application file for complete search history.

(56) References Cited

U.S. PATENT DOCUMENTS

| | | | |
|---|---|---|---|
| 4,148,772 A | 4/1979 | Marchetti et al. | |
| 4,419,467 A | 12/1983 | Wismer et al. | |
| 4,468,307 A | 8/1984 | Wismer et al. | |
| 5,789,468 A | 8/1998 | Chung | |
| 5,908,910 A | 6/1999 | Gam | |
| 6,207,731 B1 | 3/2001 | Gam | |
| 7,264,706 B2 | 9/2007 | Gam | |
| 2011/0094890 A1 | 4/2011 | Grosse Brinkhaus et al. | |
| 2011/0184119 A1 | 7/2011 | Bloess et al. | |
| 2017/0158882 A1* | 6/2017 | Inbe .................... | C08G 59/184 |
| 2017/0335120 A1 | 11/2017 | Gelling et al. | |

FOREIGN PATENT DOCUMENTS

| | | | |
|---|---|---|---|
| CN | 1329646 A | 1/2002 | |
| CN | 101835852 A | 9/2010 | |
| CN | 106459670 A | 2/2017 | |
| EP | 0783548 B2 | 11/2001 | |
| EP | 1731484 A1 * | 12/2006 | ............. C01G 29/00 |
| EP | 1731484 B1 | 10/2007 | |
| EP | 3124564 A1 | 2/2017 | |
| WO | 9610057 A1 | 4/1996 | |
| WO | 2014074234 A1 | 5/2014 | |

OTHER PUBLICATIONS

EPO, Extended Search Report, dated Oct. 24, 2022.

* cited by examiner

*Primary Examiner* — Louis J Rufo
(74) *Attorney, Agent, or Firm* — Ingrassia Fisher & Lorenz, LLP

(57) ABSTRACT

Aqueous cathodic electrocoating compositions, methods for preparing aqueous cathodic electrocoating compositions, and methods for electrodepositing coatings from aqueous cathodic electrocoating compositions are provided. An aqueous cathodic electrocoating composition having a binder resin and a crosslinking agent is provided. In the aqueous cathodic electrocoating composition, a bismuth-sugar solution is used to provide a catalytic amount of a bismuth compound dispersed in the electrocoating composition.

20 Claims, No Drawings

ELECTROCOATING COMPOSITION

CROSS-REFERENCE TO RELATED APPLICATIONS

This application claims the benefit of U.S. Provisional Application No. 63/194,261, filed May 28, 2021.

TECHNICAL FIELD

The technical field generally relates to cathodic electrocoating compositions and in particular to a cathodic electrocoating composition containing a bismuth catalyst.

BACKGROUND

The coating of electrically conductive substrates by an electrodeposition process, also called an electrocoating process, is a well known and important industrial process. Electrodeposition of primers to metal automotive substrates is widely used in the automotive industry. In this process, a conductive article, such as an autobody or an auto part, is immersed in a bath of a coating composition of an aqueous emulsion of film forming polymer and the article acts as an electrode in the electrodeposition process. An electric current is passed between the article and a counter-electrode in electrical contact with the coating composition, until a coating of a desired thickness is deposited on the article. In a cathodic electrocoating process, the article to be coated is the cathode and the counter-electrode is the anode.

Film forming resin compositions used in the bath of a typical cathodic electrodeposition process also are well known in the art. These resins typically are made by chain extending polyepoxide resins and forming an adduct to include amine groups in the resin. Amine groups typically are introduced through a reaction of the resin with an amine compound. These resins are blended with a crosslinking agent and then neutralized with an acid to form a water emulsion which is usually referred to as a principal emulsion.

For pigmented coatings, the principal emulsion is combined with a pigment paste, coalescent solvents, water, and other additives such as a catalyst to form the electrocoating bath. The electrocoating bath is placed in an insulated tank containing the anode. The article to be coated is the cathode and is passed through the tank containing the electrodeposition bath. The thickness of the coating that is deposited on the article being electrocoated is a function of the bath characteristics, the electrical operating characteristics of the tank, the immersion time, and the like.

The resulting coated article is removed from the bath and is rinsed with deionized water. The coating on the article is cured typically in an oven at sufficient temperature to form a crosslinked finish on the article. The presence of the catalyst enhances the crosslinking of the finish.

Typical catalysts used in the past have included lead and tin compounds such as dibutyl tin oxide which in some European countries have been held to be ecologically objectionable and regulations have been enacted to prevent the use of such metal catalysts. As a result, bismuth has been introduced as a catalyst for crosslinking electrocoatings during high bake temperature curing processes. For example, one approach has been to dissolve bismuth oxide in an aqueous acid for addition to the pigment dispersion.

There is a need for a catalyst system that will adequately catalyze the crosslinking reaction, after the electrocoating composition has been electrodeposited on a substrate, at low bake temperatures. There is a need for an electrocoating composition having a high level of bismuth catalyst for sufficient catalytic activity at low bake temperatures, is ecologically acceptable throughout the world, and is readily dispersed in an electrocoating composition and does not require the presence of other metal catalysts to be effective.

SUMMARY

Aqueous cathodic electrocoating compositions, methods for preparing aqueous cathodic electrocoating compositions, and methods for electrodepositing coatings from aqueous cathodic electrocoating compositions are provided. In an exemplary embodiment, an improved aqueous cathodic electrocoating composition having a binder resin and a crosslinking agent is provided. The improvement is the use of a bismuth-sugar solution to provide a catalytic amount of a bismuth compound dispersed in the electrocoating composition. In certain embodiments, the bismuth compound is bismuth subnitrate. In certain embodiments, the bismuth-sugar solution has a bismuth content of at least 200 g/L, such as at least 240 g/L. In certain embodiments, the bismuth-sugar solution provides the bismuth compound in an amount of 0.1-5% by weight based on the weight of the binder resin, such as in an amount of 1-4% by weight, based on the weight of the binder resin. In certain embodiments, the binder resin is an epoxy amine adduct and the crosslinking agent is a blocked polyisocyanate. In certain embodiments, the composition is free of any catalyst other than the bismuth compound. In certain embodiments, the improved aqueous cathodic electrocoating composition further includes pigment. In other embodiments, the improved aqueous cathodic electrocoating composition is free of pigment.

In another exemplary embodiment, an aqueous cathodic electrocoating composition includes a binder resin, a crosslinking agent, and a bismuth-sugar solution, wherein the bismuth-sugar solution provides a catalytic amount of a bismuth compound dispersed in the electrocoating composition. In certain embodiments, the bismuth compound is bismuth subnitrate. In certain embodiments, the bismuth-sugar solution has a bismuth content of at least 200 g/L, such as at least 240 g/L. In certain embodiments, the bismuth-sugar solution provides the bismuth compound in an amount of 0.1-5% by weight based on the weight of the binder resin, such as in an amount of 1-4% by weight based on the weight of the binder resin. In certain embodiments, the binder resin is an epoxy amine adduct and the crosslinking agent is a blocked polyisocyanate. In certain embodiments, the composition is free of any catalyst other than bismuth. In certain embodiments, the aqueous cathodic electrocoating composition of claim A1 further includes pigment. In other embodiments, the aqueous cathodic electrocoating composition is free of pigment.

Another exemplary embodiment provides a method for preparing a cathodic electrocoating composition, the method comprising: blending a binder resin with a crosslinking agent; neutralizing the binder resin to form an emulsion; blending a pigment dispersion with the emulsion; and blending a bismuth-sugar solution with the emulsion and/or with the pigment dispersion before blending the pigment dispersion with the emulsion, wherein the bismuth-sugar solution includes a catalytic amount of a bismuth compound. In certain embodiments, the bismuth compound is bismuth subnitrate. In certain embodiments, the bismuth-sugar solution has a bismuth content of at least 200 g/L. In certain embodiments, the bismuth-sugar solution provides the bismuth compound in an amount of 1-4% by weight, based on the weight of the binder resin. In certain embodiments, the binder resin is an epoxy amine adduct; the crosslinking agent is a blocked polyisocyanate crosslinking agent; and neutralizing the binder resin to form an emulsion comprises neutralizing the epoxy amine adduct with an organic or inorganic acid to form the emulsion. In certain embodiments, the composition is free of any catalyst other than bismuth.

In yet another embodiment, a method for electrodepositing a coating, the method comprising: preparing an aqueous dispersion composition from a binder resin, a crosslinking agent, and a bismuth-sugar solution, wherein a catalytic amount of bismuth is dispersed in the aqueous dispersion composition; providing an electrochemical cell comprising: i) the aqueous dispersion composition; ii) a substrate to be coated, wherein the substrate is in contact with the aqueous dispersion composition and the substrate serves as a cathode of the electrochemical cell; iii) an anode in contact with the aqueous dispersion composition; and iv) a power supply in electrical contact with the anode and cathode; applying a voltage between the cathode and the anode to electrodeposit the coating onto at least a portion of the substrate; and curing the coating by baking the coating and substrate at a low bake temperature of less than 130° C. In certain embodiments, curing the coating by baking the coating and substrate at a low bake temperature of less than 130° C. comprises baking the coating and substrate at a temperature of no more than 120° C. In certain embodiments, the bismuth-sugar solution has a bismuth content of at least 200 g/L. In certain embodiments, the bismuth-sugar solution provides the bismuth compound in an amount of 0.1-5% by weight, based on the weight of the binder resin.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DETAILED DESCRIPTION

The following detailed description is merely exemplary in nature and is not intended to limit the electrocoating compositions and methods for forming electrocoating compositions as described herein. Furthermore, there is no intention to be bound by any theory presented in the preceding background or summary or in the following detailed description.

An electrocoating composition for coating a substrate is provided herein. The electrocoating composition may be utilized to coat any type of substrate known in the art. In embodiments, the substrate is a vehicle, automobile, or automobile vehicle. "Vehicle" or "automobile" or "automobile vehicle" includes an automobile, such as, car, van, minivan, bus, SUV (sports utility vehicle); truck; semi-truck; tractor; motorcycle; trailer; ATV (all-terrain vehicle); pickup truck; heavy duty mover, such as, bulldozer, mobile crane and earth mover; airplanes; boats; ships; and other modes of transport.

As used herein, "a," "an," or "the" means one or more unless otherwise specified. The term "or" can be conjunctive or disjunctive. Open terms such as "include," "including," "contain," "containing" and the like mean "comprising." The term "about" as used in connection with a numerical value throughout the specification and the claims denotes an interval of accuracy, familiar and acceptable to a person skilled in the art. In general, such interval of accuracy is ±ten percent. Thus, "about ten" means nine to eleven. All numbers in this description indicating amounts, ratios of materials, physical properties of materials, and/or use are to be understood as modified by the word "about," except as otherwise explicitly indicated. As used herein, the "%" described in the present disclosure refers to the weight percentage unless otherwise indicated.

The electrocoating composition is utilized to deposit a coating layer on the substrate. Exemplary embodiments herein provide a full electrocoating bath to deposit a coating layer on a substrate. Certain embodiments utilize epoxy amine based binder resins that are neutralized with acids to form emulsions.

As described herein, a bismuth-sugar solution provides for adequate dispersion of bismuth compounds in an electrocoating composition to provide effective catalytic activity for the reaction between the epoxy amine adduct and the polyisocyanate crosslinking agent under low bake temperatures conditions after the composition has been cathodically electrodeposited on a substrate. Unlike conventional products, the bismuth-sugar solution may be incorporated into the resin, into the pigment dispersion, or partially into the resin and partially into the pigment dispersion, used in the formulation of the electrocoating composition. Generally, a catalytic amount of the bismuth compound is used in the electrocoating composition such as in amounts of 0.1-5% by weight, based on the weight of the film forming binder of the composition.

Cure response of the bismuth compound described herein, as measured by the coatings resistance to solvents is as good as and at times better than conventional bismuth oxide catalysts. Corrosion resistance, chip resistance and adhesion are not adversely affected by the described bismuth catalyst in comparison to the conventional bismuth catalysts that are currently being used.

Sugar-Bismuth Solution

As described herein, a catalyst is provided for use in a cathodic electrocoating composition by adding a bismuth-sugar solution to the resin dispersion and/or pigment paste. The catalyst is provided to catalyze full crosslinking during a curing process at a low bake temperature. In exemplary embodiment, the cathodic electrocoating composition is free of any curing catalyst other than the bismuth compound provided by the bismuth-sugar solution. In other embodiments, an additional curing catalyst or additional curing catalysts may be used.

An exemplary bismuth-sugar solution is comprised of a bismuth compound and a polyhydroxy compound. An exemplary bismuth-sugar solution consists or consists essentially of water, a bismuth compound, and a polyhydroxy compound.

An exemplary bismuth-sugar solution is described in European Pat. No. EP 1,731,484 B1, published Dec. 13, 2006, which is herein incorporated by reference. An exemplary aqueous bismuth-sugar solution includes a bismuth salt and a polyhydroxy compound and has a pH greater than 1.

In exemplary embodiments, the bismuth compound is a bismuth salt and the polyhydroxy compounds are sugar aldoses or sugar ketoses. Suitable bismuth salts are bismuth subnitrate, bismuth hydroxide, bismuth oxide, bismuth subcarbonate, bismuth subsalicylate and bismuth citrate, whereas fructose, xylose, arabinose, galactose, glucose and mannose are suitable as sugar aldoses and sugar ketoses.

The bismuth content of the solution may depend on the bismuth compounds and polyhydroxy compounds that are used. High bismuth levels are present in aqueous solutions of bismuth subnitrate and sugar alcohols. For such aqueous solutions, the bismuth content is from 100 to 300 grams per liter (g/L).

In an exemplary embodiment, the bismuth-sugar solution comprises bismuth subnitrate as the bismuth compound and comprises sugar alcohol as the polyhydroxy compound. Exemplary sugar alcohols include dulcitol, sorbitol, xylitol or mannitol.

In exemplary embodiments, the bismuth compound is a bismuth salt and the polyhydroxy compound is a disaccharide or glycerine. For such embodiment, suitable disaccharides are sucrose, lactose and maltose. An exemplary bismuth salt is a bismuth hydroxide or a bismuth subnitrate. It has been found that aqueous solutions of a bismuth compound and a disaccharide may be observed as yellow solutions.

The polyhydroxy compound may be a mixture of sugar aldoses, sugar ketoses, sugar alcohols, disaccharides and glycerol, or the polyhydroxy compound may be a mixture of a combination of sugar aldoses, sugar ketoses, sugar alcohols, disaccharides, and glycerin.

Exemplary embodiments of bismuth-sugar solutions are formed as solutions of bismuth hydroxide and bismuth subnitrate, which have high bismuth contents. Thus, an exemplary bismuth salt is a bismuth hydroxide or a bismuth subnitrate.

In certain embodiments, the sugar alcohol is a sorbitol. In an aqueous solution of bismuth subnitrate and sorbitol, it has been found that the ratio of sorbitol to dissolved bismuth is approximately constant regardless of concentration. An increase in the sorbitol concentration thus leads to an increase in the bismuth content. By employing an excess of bismuth compounds, it is thus ensured that no possibly interfering excess of polyhydroxy compounds is present.

In certain embodiments, the bismuth compounds and the polyhydroxy compounds are reaction products heated for 1 to 5 hours at 40 to 100° C. with an excess of bismuth compounds. Also, the bismuth compounds and the polyhydroxy compounds may be reaction products heated for 1 to 3 hours at 60 to 80° C. The mentioned time and temperature intervals may vary, as other intervals are conceivable.

After the reaction any remaining solid may be separated from the solution. This can be done by filtration, sedimentation or centrifugation. Appropriately, therefore, the solution is separated from any solid. Furthermore, it is possible to dry the aqueous solution.

In an exemplary process for the preparation of a bismuth solution with a bismuth compound and a polyhydroxy compound, a bismuth salt is used as the bismuth compound and a pH greater than 1 is set for the solution. In the process, the bismuth compound is reacted with the polyhydroxy compound in aqueous solution. For example, the bismuth compound is allowed to react with a solution of the polyhydroxy compound in water for 1 to 5 hours under heating, such as at 40 to 100° C.

Furthermore, it was found that the filtrate in a solution of bismuth subnitrate and polyhydroxy compound is ionic only to a small extent. The ratio of ionic to total nitrate in the solution is about 1:10 mol/L. The non-ionic nitrate moiety is believed to be covalently attached to the bound bismuth. Such solutions thus contain only a small proportion of other ionic substances, despite the high bismuth content.

As described herein the bismuth-sugar solution is used as a catalyst in the paint and automotive industries. Because of the non-toxic properties of bismuth, toxic compounds of lead and tin are thereby replaced. Further, organic solvents are replaced by water, thereby avoiding environmental and health problems. Bismuth compounds heretofore used are bismuth salts with methanesulfonic acid, lactic acid, salicylic acid and dimethylpropionic acid.

Preparation of a formulation of a bismuth-sugar solution is provided in the following Examples.

Example 1

In a laboratory beaker, 300 g of sorbitol is dissolved in 1,000 ml of deionized water. The solution is brought to a temperature of 70° C. Then, with stirring, 400 g of bismuth subnitrate is mixed with the solution. The mixture is stirred vigorously for one hour while heating to 86° C. After the reaction time, the solution is filtered and brought to a final volume of 1100 ml with water. This gives a clear solution with a bismuth content of 230 g/L and a pH of 1.7.

Example 2

In a laboratory beaker 15 g of sucrose is dissolved in 50 ml of deionized water. The solution is brought to a temperature of 50° C. Then 20 g of bismuth hydroxide is mixed with the solution with stirring. The mixture is stirred vigorously for 1 hour while maintained at 76° C. After the reaction time, the solution is centrifuged. Thus, a clear solution having a bismuth content of 30 g/L and a pH of 6.7 is obtained.

In an exemplary embodiment, the bismuth-sugar solution employed herein has a bismuth content of 242 g/L, a density of 1.4 g/mL, a pH of 2.4, clear clarity, and a yellowish color.

In exemplary embodiments, the bismuth-sugar solution has a bismuth content of at least 100 g/L, such as at least 150 g/L, for example at least 175 g/L, such as at least 200 g/L, for example at least 210 g/L, such as at least 220 g/L, for example at least 230 g/L, such as at least 240 g/L, for example at least 242 g/L, such as at least 250 g/L or at least 260 g/L. In exemplary embodiments, the bismuth-sugar solution has a bismuth content of no more than 400 g/L, such as no more than 375 g/L, for example no more than 350 g/L, such as no more than 325 g/L, for example no more than 300 g/L, such as no more than 290 g/L, for example no more than 280 g/L, such as no more than 270 g/L, for example no more than 260 g/L, such as no more than 250 g/L, for example no more than 260 g/L, such as no more than 250 g/L, for example no more than 255 g/L, such as no more than 252 g/L, such as no more than 250 g/L, for example no more than 240 g/L.

The exemplary bismuth-sugar solution may have a density of at least 0.5 g/mL, such as at least 0.75 g/mL, for example at least 1 g/mL, such as at least 1.1 g/mL, for example at least 1.2 g/mL, such as at least 1.3 g/mL, for example at least 1.4 g/mL, or at least 1.5. The exemplary bismuth-sugar solution may have a density of no more than 3 g/L, such as no more than 2.75 g/L, for example no more than 2.5 g/L, such as no more than 2.25 g/L, for example no more than 2 g/L, such as no more than 1.8 g/L, for example no more than 1.7 g/L, such as no more than 1.6 g/L, for example no more than 1.5 g/L, or no more than 1.4 g/L.

The exemplary bismuth-sugar solution may have a pH of at least 1, such as at least 1.1, for example at least 1.2, such as at least 1.3, for example at least 1.4, such as at least 1.5, for example at least 1.6, such as at least 1.7, for example at least 1.8, such as at least 1.9, for example at least 2, such as at least 2.1, for example at least 2.2, such as at least 2.3, for example at least 2.4, such as at least 2.5, for example at least 2.6. The exemplary bismuth-sugar solution may have a pH of no more than 4, such as no more than 3.5, for example no more than 3.4, such as no more than 3.3, for example no more than 3.2, such as no more than 3.1, for example no more than 3, such as no more than 2.9, for example no more than 2.8, such as no more than 2.7, for example no more than 2.6, such as no more than 2.5, for example no more than 2.4, such as no more than 2.3, for example no more than 2.2, such as no more than 2.1 or no more than 2.

It has been found herein, that incorporation of the bismuth-sugar solution as the source of bismuth catalyst in an epoxy-based cathodic electrocoating composition as described herein allows for superior low bake performance, i.e., at temperatures less than 130° C.—such as at 120° C. Specifically, such compositions remain stable at very high loading of catalyst, which may be required for low bake processing. For example, very high loading of catalyst is believed to provide for full crosslinking despite low bake temperatures. Thus, embodiments herein provide for proper electrodeposition and formation of acceptable coatings formed with good surface quality at low bake temperatures while commercially available products typically suffer from poor surface quality of coatings electrodeposited at low bake temperatures.

Binder Resin

The epoxy amine adduct of an exemplary coating composition is the reaction product of an epoxy resin of a polyglycidyl ether and a polyphenol and an amine. The resulting epoxy amine adduct has reactive amine and epoxy groups. The epoxy resin which is a poly epoxy hydroxy ether resin has a 1,2-epoxy equivalency of about two or more, that is, a polyepoxide which has on an average basis two or more epoxy groups per molecule. The preferred polyepoxides are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2,bis-(4-hydroxyphenyl)ethane, 2-methyl-1,1-bis-(4-hydroxyphenyl)propane, 2,2-bis-(4-hydroxy-3-tertiary-butylphenyl)propane, 1,1-bis-(4-hydroxyphenol)ethane, bis-(2-hydroxynaphthyl)methane, 1,5-dihydroxy-3-naphthalene or the like.

Besides polyhydric phenols, other cyclic polyols can be used such as alicyclic polyols, particularly cycloaliphatic polyols, such as 1,2-bis(hydroxymethyl)cyclohexane, 1,3-bis-(hydroxymethyl)cyclohexane, 1,2 cyclohexane diol, 1.4, cyclohexane diol and hydrogenated bisphenol A.

The polyepoxides have molecular weights of at least 200 and preferably within the range of 200 to 3000, and more preferably about 340 to 2000.

The polyepoxide resin can be chain extended for example with any of the aforementioned polyhydric phenols such as bisphenol A and ethoxylated bisphenol A and preferably a combination of these phenols. Also, the polyepoxides can be chain extended with a polyether or a polyester polyol which enhances flow and coalescence. Typical useful chain extenders are polyols such as polycaprolactone diols such as Tone 200® series available from Union Carbide Corporation and ethyoxylated bisphenol A such as SYNFAC 8009® available from Milliken Chemical Company.

Examples of polyether polyols and conditions for chain extension are disclosed in U.S. Pat. No. 4,468,307. Examples of polyester polyols for chain extension are disclosed in U.S. Pat. No. 4,148,772.

The amines used to prepare the epoxy amine adduct can be primary or secondary amines or mixtures thereof. Preferred amines are monoamines, particularly hydroxyl containing amines such as alkanol amines, dialkanol amines, trialkanol amines, alkyl alkanol amines, arylalkanol amines and arylalkylalkanolamines containing from 2-18 carbon atoms in the aryl, alkyl and aryl chains. Typically, useful amines include ethanolamine, methyl ethanol amine, N-methyl-ethanolamine, diethanolamine, N-phenylethanolamine, and the like. Other amines that can be used are set forth in U.S. Pat. No. 4,419,467 which is hereby incorporated by reference.

The cathodic binder of the epoxy amine adduct and the blocked isocyanate are the principal resinous ingredients in the electrocoating composition and are usually present in amounts of about 30 to 50% by weight of solids of the composition. The binder is neutralized with an acid to form a water soluble product. Typically useful acids are lactic acid, acetic acid, formic acid, sulfamic acid, alkane sulfonic acids such as methane sulfonic acids, ethane sulfonic acid, propane sulfonic acid and the like. To form an electrocoating bath, the solids of the electrocoating composition are generally reduced with an aqueous medium to the desired bath solids.

Crosslinking Agent

Suitable crosslinking agents are known in the art, and include, but are not limited to, blocked isocyanates, melamine-formaldehyde resins, tris(alkoxycarbonyl-amino)triazines, alkoxysilanes, and polyepoxides. A blocked polyisocyanate crosslinking agent is used in an exemplary electrocoating composition. Preferred crosslinking agents for the above adduct are also well known in the prior art. These are aliphatic, cycloaliphatic and aromatic isocyanates such as hexamethylene diisocyanate, cyclohexamethylene diisocyanate, toluene diisocyanate, methylene diphenyl diisocyanate polymeric methylene diphenyl diisocyanate and the like. These isocyanates are pre-reacted with a blocking agent such as oximes, alcohols, or caprolactams which block the isocyanate functionality, i.e., the crosslinking functionality. Upon heating the blocking agents separate, thereby providing a reactive isocyanate group and crosslinking occurs. Isocyanate crosslinking and blocking agents are well known in the prior art and also are disclosed in the aforementioned U.S. Pat. No. 4,419,467. In some embodiments, the blocked isocyanate crosslinking agent is an alcohol blocked, methylene diphenyl diisocyanate, as described by U.S. Pat. No. 6,207,731. In some embodiments, the crosslinking agent is an alkoxysilane, such as 3-(isocyanatopropyl)triethoxysilane.

The aqueous dispersion generally contains about 10% to about 50%, more particularly, about 30% to about 40% by weight of the resin binder and the crosslinking agent. The aqueous dispersion may be further diluted with water when added to an electrocoating bath to give a range of about 10% to about 30% by weight of the resin binder and the crosslinking agent.

Pigment

The aqueous dispersion may also comprise at least one pigment. In certain embodiments, the composition is substantially free of pigment, such as for use as a clear coat.

Pigments for use herein may be selected from color pigments, effect pigments, electrically conductive pigments, magnetically shielding pigments, extender pigments, and anti-corrosion pigments. Examples of useful pigments include, but are not limited to, titanium dioxide, basic lead silicate, strontium chromate, carbon black, iron oxide, clay and the like. Pigments with high surface areas and oil absorbencies should be used judiciously because these can have an undesirable affect on coalescence and flow of the electrodeposited coating.

The pigment is incorporated into the electrocoating composition in the form of a pigment paste. The pigment paste is prepared by grinding or dispersing a pigment into a grinding vehicle. The pigment paste may be dispersed into the grinding vehicle with the bismuth-sugar solution and other optional ingredients such as anticratering agents wetting agents, surfactants, and defoamers. Any of the pigment grinding vehicles that are well known in the art can be used. Typically, grinding is done using conventional equipment known in the art such as an Eiger mill Dynomill or sand mill. After grinding, the particle size of the pigment should be as small as practical, generally, the particle size is about 6-8 using a Hegman grinding gauge.

Viscosity of the pigment dispersion before it is ground or milled may be important. B Brookfield viscosity typically is used determined in accordance with ASTM D-2196. While the desired viscosity will vary with the selected components, viscosity generally will be in the range of 8000 centipoise to 1500 centipoise (0.8 Pa·s to 115 Pa·s) to achieve a fine grind during grinding. Viscosity typically increases during grinding and is readily adjusted by modifying the amount of water present.

The pigment to binder weight ratio is also important and should be preferably less than 0.5:1, more preferably less than 0.4:1, and usually about 0.2 to 0.4:1. Higher pigment to binder weight ratios have been found to adversely affect coalescence and flow.

Optional Additives

The electrocoating compositions of the invention can contain optional additives such as wetting agents, surfactants, defoamers, light stabilizers, anti-crater agents, flow aids, dispersion stabilizers, adhesion promoters, corrosion inhibitors, fillers, and the like. Examples of surfactants and wetting agents include alkyl imidazolines such as those available from Ciba-Geigy Industrial Chemicals as "Amine C", nonionic surfactants or acetylenic alcohols available from Air Products and Chemicals as "Surfynol 104"; and alkoxylated styrenated phenols, such as, for example, "Synfac 8334", available from Milliken Chemical Company, Spartanburg, S.C. Combinations of surfactants can also be used.

Light stabilizers, such as, for example, hindered amine light stabilizers can be added to the aqueous dispersion composition. Representative commercially available hindered amine light stabilizers can be, for example, Tinuvi N 770, 292 and 440 which are sold by Ciba Specialty Chemicals Corporation. The aqueous dispersion composition may also comprise at least one anti-crater agent. Anti-crater agents are well known in the art; examples are given by U.S. Pat. Nos. 5,789,468; 5,908,910; 6,207,731; and 7,264,706. Flow aids include materials such as, for example, ethylene and/or propylene adducts of nonyl phenols or bisphenols.

Optionally, plasticizers can be used to promote flow. Examples of useful plasticizers are high boiling water immiscible materials such as ethylene or propylene oxide adducts of nonyl phenols or bisphenol A. Plasticizers are usually used at levels of about 0.1 to 15 percent by weight resin solids.

These optional additives, when present, may constitute from 0.1 to 20 percent by weight of binder solids of the composition.

Aqueous Dispersion

The electrocoating composition described herein is an aqueous dispersion. The term "dispersion" as used herein is believed to be a two-phase translucent or opaque aqueous resinous binder system in which the binder is in the dispersed phase and water the continuous phase. The average particle size diameter of the binder phase is about 0.1 to 10 microns, preferably, less than 5 microns. The concentration of the binder in the aqueous medium in general is not critical, but ordinarily the major portion of the aqueous dispersion is water. The aqueous dispersion usually contains from about 3 to 50 percent preferably 5 to 40 percent by weight binder solids. Aqueous binder concentrates which are to be further diluted with water when added to an electrocoating bath, generally have a range of binder solids of 10 to 30 percent weight.

An aqueous dispersion of the binder resin can be prepared by adding the binder resin to water and adjusting the pH to about 5.0 to 7.0, more particularly, about 6.0 to 7.0, and more particularly, about 6.5 to 7.0, with the addition of an acid. Suitable acids include, but are not limited to, acetic acid, sulfonic acid, formic acid, phosphoric acid, and fatty acids, such as lauryl acid. The dispersing agent for the disclosed binder resins is water; however, small amounts of volatile organic solvents may be present. The resulting mixture is stirred using methods and apparatus known in the art, such as stirred tanks, stirred mills, static mixers, and the like. The mixture may be heated to aid in the formation of the dispersion.

The aqueous dispersion can also be prepared using a phase inversion process, wherein the resin binder is first dissolved in an organic solvent, such as methyl isobutyl ketone. The resulting solution is then poured into an acidified aqueous solution having a pH of about 5.0 to 7.0, more particularly, about 6.0 to 7.0, and more particularly, about 6.5 to 7.0, with high speed mixing. The solvent is removed using methods known in the art, such as evaporation, to yield the aqueous dispersion.

Method for Preparing Cathodic Electrocoating Composition

It is noted that the sugar-bismuth solution may be added to either the binder resin or to a pigment paste, if preparing a pigmented composition, or to both the binder resin and pigment paste. An exemplary method for preparing a cathodic electrocoating composition includes blending a binder resin with a crosslinking agent; neutralizing the binder resin to form an emulsion; and blending a pigment dispersion with the emulsion. Further, the exemplary method includes blending a bismuth-sugar solution with the emulsion and/or with the pigment dispersion before blending the pigment dispersion with the emulsion, wherein the bismuth-sugar solution includes a catalytic amount of a bismuth compound.

In exemplary embodiments, the amounts of bismuth-sugar solution, binder resin and crosslinking agent, pigment dispersion are selected such that the bismuth-sugar solution provides the bismuth compound to the resulting composition in an amount of from 1 to 4% by weight, based on the weight of the binder resin. For example, the bismuth compound may be present in the exemplary composition, based on the weight of the binder resin, in an amount of at least 1.1 wt. %, such as at least 1.2, for example at least 1.3, such as at least 1.4, for example at least 1.5, such as at least 1.6, for example at least 1.7, such as at least 1.8, for example at least 1.9, such as at least 2, for example at least 2.1, such as at least 2.2, for example at least 2.3, such as at least 2.4, for example at least 2.5, such as at least 2.6, for example at least 2.7, such as at least 2.8, for example at least 2.9, such as at least 3, for example at least 3.1, such as at least 3.2, for example at least 3.3, such as at least 3.4, for example at least 3.5, such as at least 3.6, for example at least 3.7, such as at least 3.8, for example at least 3.9, such as at least 4, for example at least 4.1, such as at least 4.2, for example at least 4.3, such as at least 4.4, for example at least 4.5, such as at least 4.6, for example at least 4.7, such as at least 4.8, for example at least 4.9, such as at least 5, for example at least 5.1, such as at least 5.2, for example at least 5.3, such as at least 5.4, for example at least 5.5, such as at least 5.6, for example at least 5.7, such as at least 5.8, for example at least 5.9, such as at least 6, for example at least 6.1, such as at least 6.2, for example at least 6.3, such as at least 6.4, for example at least 6.5, such as at least 6.6, for example at least 6.7, such as at least 6.8, for example at least 6.9, such as at least 7, for example at least 7.1, such as at least 7.2, for example at least 7.3, such as at least 7.4, for example at least 7.5, such as at least 7.6, for example at least 7.7, such as at least 7.8, for example at least 7.9, such as at least 8 wt. %. Further, the bismuth compound may be present in the exemplary composition, based on the weight of the binder resin, in an amount of no more than 8 wt. %, for example no more than 7.9, such as no more than 7.8, for example no more than 7.7, such as no more than 7.6, for example no more than 7.5, such as no more than 7.4, for example no more than 7.3, such as no more than 7.2, for example no more than 7.1, such as no more than 7, for example no more than 6.9, such as no more than 6.8, for example no more than 6.7, such as no more than 6.6, for example no more than 6.5, such as no more than 6.4, for example no more than 6.3, such as no more than 6.2, for example no more than 6.1, such as no more than 6, for example no more than 5.9, such as no more than 5.8, for example no more than 5.7, such as no more than 5.6, for example no more than 5.5, such as no more than 5.4, for example no more than 5.3, such as no more than 5.2, for example no more than 5.1, such as no more than 5, for example no more than 4.9, such as no more than 4.8, for example no more than 4.7, such as no more than 4.6, for example no more than 4.5, such as no more than 4.4, for example no more than 4.3, such as no more than 4.2, for example no more than 4.1, such as no more than 4, for example no more than 3.9, such as no more than 3.8, for example no more than 3.7, such as no more than 3.6, for example no more than 3.5, such as no more than 3.4, for example no more than 3.3, such as no more than 3.2, for example no more than 3.1, such as no more than 3, for example no more than 2.9, such as no more than 2.8, for example no more than 2.7, such as no more than 2.6, for example no more than 2.5, such as no more than 2.4, for example no more than 2.3, such as no more than 2.2, for example no more than 2.1, such as no more than 2, for example no more than 1.9, such as no more than 1.8, for example no more than 1.7, such as no more than 1.6, for example no more than 1.5, such as no more than 1.4, for example no more than 1.3, such as no more than 1.2, for example no more than 1.1 wt. %.

Method for Electrodepositing Coating

The aqueous dispersion disclosed herein can be used in a conventional cathodic electrocoating process performed at low bake temperatures to coat a substrate. Accordingly, an embodiment of a process for electrodepositing a coating includes preparing an aqueous dispersion composition from a binder resin, a crosslinking agent, and a bismuth-sugar solution, wherein a catalytic amount of bismuth is dispersed in the aqueous dispersion composition. The exemplary method further includes providing an electrochemical cell comprising: i) the aqueous dispersion composition; ii) a substrate to be coated, wherein the substrate is in contact with the aqueous dispersion composition and the substrate serves as a cathode of the electrochemical cell; iii) an anode in contact with the aqueous dispersion composition; and iv) a power supply in electrical contact with the anode and cathode. The method also includes applying a voltage between the cathode and the anode to electrodeposit the coating onto at least a portion of the substrate. Also, the method includes curing the coating by baking the coating substrate to a selected metal temperature that is a low bake temperature of less than 130° C., such as at a temperature less than 129° C., 128° C., 127° C., 126° C., 125° C., 124° C., 123° C., 122° C., 121° C., 120° C., 119° C., 118° C., 117° C., 116° C., 115° C., 114° C., 113° C., 112° C., 111° C., or 110° C. In exemplary embodiments, the method includes curing the coating by baking the coating and substrate at a selected low bake temperature of greater than 100° C., such as at a temperature greater than 105° C., 110° C., 111° C., 112° C., 113° C., 114° C., 115° C., 116° C., 117° C., 118° C., 119° C., or 120° C. Heating may be done using any means known in the art, such as heating in a baking oven, with a bank of infrared lamps, or a combination thereof. Heating the coated substrate at the selected temperature is performed for a sufficient time to cure the coating, typically about 10 minutes.

The method may include removing the coated substrate from the aqueous dispersion after the coating has been deposited thereon. Optionally, the method may include rinsing the coated substrate before baking.

In one embodiment, the substrate is partially immersed in the aqueous dispersion. In another embodiment, the entire substrate is immersed in the aqueous dispersion.

In exemplary embodiments, the immersion time is sufficient to obtain a cured coating of 12-50 microns, such as 13-45 microns, for example 15-38 microns, or 20-30 microns.

Useful substrates that can be coated using the process disclosed herein are electrically conductive substrates including, but not limited to, metallic materials, for example ferrous metals such as iron, steel, and alloys thereof, non-ferrous metals such as aluminum, zinc, magnesium and alloys thereof, and combinations thereof. In some embodiments, the substrate is cold-rolled steel, zinc-coated steel, aluminum or magnesium.

The voltages that are applied in the process vary depending on the type of coating and on the coating thickness desired and may be as low as 1 volt or as high as several thousand volts. Typical voltages used are between 50 to 500 volts, such as from 200 to 270 volts.

The current density can vary in the range from 1 ampere per square meter to 150 amperes per square meter. The process is typically carried out at a temperature between 25° C. to about 40° C. The time required for the process will vary depending on the desired thickness of the polymer coating.

Coating voltages, rupture voltages, bath stability of electrocoating baths formulated with the bismuth-sugar solution and corrosion performance of film containing bismuth catalyst compounds from the bismuth-sugar solution are the same as or very similar to metal catalysts such as bismuth trioxide catalyst and dibutyl tin oxide.

The substrate that is coated with the dried and cured polymer coating can be used as is or additional layers of coating compositions can be applied thereon. In the manufacture of automobiles and other consumer goods, the cured polymer coating can be further coated with one or more of commercially available primers, primer surfacers, sealers, basecoat compositions, clearcoat compositions, glossy topcoat compositions and any combination thereof.

The coated substrates can be various articles used as components to fabricate automotive vehicles, automobile bodies, any and all items manufactured and painted, such as, for example, frame rails, commercial trucks and truck bodies, including but not limited to beverage truck bodies, utility truck bodies, ready mix concrete delivery vehicle bodies, waste hauling vehicle bodies, and fire and emergency vehicle bodies, as well as any potential attachments or components to such truck bodies, buses, farm and construction equipment, truck caps and covers, commercial trailers, consumer trailers, recreational vehicles, including but not limited to, motor homes, campers, conversion vans, vans, pleasure vehicles, pleasure craft, snow mobiles, all terrain vehicles, personal watercraft, motorcycles, boats, and aircraft. The substrate further includes industrial and commercial new construction components; walls of commercial and residential structures, such as office buildings and homes; amusement park equipment; marine surfaces; outdoor structures, such as bridges, towers; coil coating; railroad cars; machinery; OEM tools; signage; sporting goods; and sporting equipment. The substrates can have any shape, for example, in the form of automotive body components, such as bodies (frames), hoods, doors, fenders, bumpers and/or trim, for automotive vehicles.

Testing

Testing was performed on an exemplary embodiment and on reference compositions. For example, in Table 1, BATH 1 was prepared with a dispersion referenced as Dispersion A, and including no catalyst; BATH 2 was prepared with the same Dispersion A but with 1.6 wt. % active bismuth, with respect to binder solid, provided by the disclosed exemplary bismuth-sugar solution; BATH 6 was prepared with the same Dispersion A but with 1.6 wt. % active bismuth, with respect to binder solid, provided by bismuth lactate and dimethylolpropionate complexes; and BATH 3 was prepared with a dispersion referenced as Dispersion B, as a standard electrocoating system.

Dispersion A may be prepared according to Example 2 of European Patent No. EP 0783548 B2 (which is incorporated in its entirety by reference). In Example 2a, 570 grams of an epoxy resin based on bisphenol A (epoxy equivalent 190) and 317 grams of methoxypropanol are heated to 60° C., within 2 hours with a mixture of 116 grams of ethylhexylamine and 163 grams of a polymer amines and reacted up to an MEQ value of 2.06. Then, 1330 grams of a 75% solution of a bisphenol A epoxy resin (epoxy equivalent 475) in methoxypropanol was added. As a result, a solution of 189 diethanolamine in 176 grams of methoxypropanol is obtained at 60° C. within one hour added and the reaction led to an MEQ value of 1.57. After further adding a solution of 78 grams diethylaminopropylamine in 54 grams methoxypropanol within one hour at 60° C. to a MEQ value of 1.46 responded. The temperature is raised to 90° C. and then to 120° C. within a further hour increased. When a viscosity (GARDNER-HOLD; 6 grams resin+4 grams methoxypropanol) of I-J is reached with diluted methoxypropanol to a solids content of 65 wt. %. The product has an amine number of 117 mg KOH/gram and a hydroxyl number of 323 mg KOH/gram, each based on the solid. The polymeric amine is obtained by reacting 1 mol of diethylenetriamine with 3.1 mol of 2-ethylhexylglycidyl ether and 0.5 moles of a bisphenol A epoxy resin (epoxy equivalent 190) in 80% methoxypropanol solution. The product has a viscosity (DIN 53 211/20° C.; 100 gram resin+30 gram methoxypropanol) of 60 to 80 seconds.

Example 2b of European Patent No. EP 0783548 B2 describes a method to prepare a crosslinking agent and includes mixing 134 grams of trimethylolpropane with 160 grams of diethyl malonate and until the start of distillation (at approximately 140-150° C.). With increasing temperature (up to 180° C.) 46 grams of ethanol are distilled off. Then, the method includes diluting with 128 grams of diethylene glycol dimethyl ether and cooling to 60° C. Then 264 grams of a reaction product of 1 mol of tolylene diisocyanate and 1 mol of ethylene glycol monoethyl ether are added within 4 hours and reacted at 60° C. to an NCO content below 0.02 milliequivalents per gram sample. The product obtained has a solids content of 80±2% by weight (30 minutes at 120° C.) after a viscosity GARDNER-HOLD (10 gram product+2 gram diethylene glycol dimethyl ether) from K and a refractive index n 20/d of 1.4960.

Example 2c of European Patent No. EP 0783548 B2 describes the mixture of the binder formed under Example 2a and the crosslinking agent formed under Example 2b. In Example 2c, the products obtained under a) and b) are mixed in a ratio of 70:30 (based on solids content). Lactic acid is then added, its being necessary to achieve perfect water solubility Quantity was determined in preliminary tests. It is heated to 70° C. and bismuth dimethylol propionate within two hours added in portions in such an amount with stirring that 1.5% by weight bismuth, based on solids content, are present in the batch. The mixture is then stirred at 60-70° C. for 6 hours and finally diluted to a solids content of 65% by weight with methoxypropanol.

An alternative method for synthesizing a dispersion is described in Example 3 of European Patent No. EP 0783548 B2. In Example 3a, 832 parts of the monocarbonate of an epoxy resin based on bisphenol A (commercial product Epicote 828) are mixed with 830 parts of a commercially available polycaprolactone polyol (commercial product CAPA 205) and 712 parts of diglycol dimethyl ether and at 70 to 140° C. with about 0.3% BF3 etherate reacted until an epoxide number of 0 is reached. 307 parts of a reaction product of 174 parts of tolylene diisocyanate (2 equivalents of NCO) with 137 parts of 2-ethylhexanol are added to this product (solids 70%, 2 equivalents of carbonate) at 40 to 80° C. in the presence of 0.3% of Zn-acetylacetonate as catalyst added with the addition of 0.3% benzyltrimethylammonium hydroxide (Triton B) with an NCO content of about 12.8%. It is reacted up to an NCO value of approx. 0 and then adjusted to approx. 70% solids with diglycol dimethyl ether.

In example 3b, to 1759 parts of a biscarbonate of an epoxy resin based on bisphenol A (commercial product Epicote 1001®) 618 parts of a reaction product of 348 parts of tolylene diisocyanate (80% 2,4-isomer; 20% 2,6-isomer) with 274 parts of 2-ethylhexanol with a residual NCO content of 12.8% are slowly added with the catalysis of 0.3% of a non-ionic emulsifier (Triton B®). The reaction is continued up to an NCO value of approximately 0. The product has a solids content of 70%. To 860 parts of bishexamethylenetriamine in 2315 parts of methoxypropanol, 622 parts of the reaction product of 137 parts of 2-ethylhexanol with 174 parts of tolylene diisocyanate are added at a temperature of 20 to 40° C. with benzyltrimethylammonium hydroxide catalysis (0.3%) (NCO content approx. 12.8%) and implemented up to an NCO content of approximately 0. Then 4737 parts of the reaction product b) and 3246 parts of the reaction product a) (each 70% in diglycol dimethyl ether) are added and reacted at 60 to 90° C. The reaction is terminated at an amine number of about 32 mg KOH/g. The resulting product is distilled off in vacuum to a solid of approximately 85%.

In Example 3c1, the product is neutralized with 30 mmol formic acid/100 grams resin. Then it is heated to 70° C. and bismuth lactate was added in portions in two hours with stirring in such an amount that 1.5% by weight bismuth, are present in the batch based on solids content. Then it is mixed for 6 hours at 60 to 70° C. After cooling, it is treated with deionized water in a dispersion with a solids content of 40% by weight.

Dispersion B may be prepared according to Example 3 of European Patent No. EP 0783548 B2, without the addition of the bismuth complex in Example 3c1. Thus, BATH 3, formed from Dispersion B includes no bismuth.

TABLE 1

| Material | BATH 1 | BATH 2 | BATH 6 | BATH 3 |
|---|---|---|---|---|
| Deionized Water | 1838 | 1838 | 1838 | 1838 |
| Dispersion A | 900 | — | — | — |
| Dispersion A + Bismuth-sugar solution (1.6 wt. % active) | — | 900 | — | — |
| Dispersion A + Bismuth from bismuth lactate/dimethylol-propionate complexes | — | — | 900 | — |
| Dispersion B | — | — | — | 900 |
| Paste EC 3500 EP (Pigment paste)* | 262 | 262 | 262 | 262 |
| Mix ratio | 3000 | 3000 | 3000 | 3000 |
| pH at 20° C. | — | 5.9 | 6.1 | 5.8 |
| Conductivity at 20° C. (μS/cm) | — | 1360 | 1380 | 1350 |
| Solids at 30' 180° C. (%) (according to DIN EN ISO 3251) | — | 13.5 | 13.0 | 12.7 |
| Ash | — | 2.59 | 2.63 | 2.70 |
| Ash-binder ratio | — | 0.24 | 0.25 | 0.27 |
| MEQ-Acid (mmol) | — | 38.1 | 40.2 | 41.6 |
| Total Solvents | — | 2.2 | 1.9 | 2.1 |
| Methoxypropanol | — | 0.8 | 0.5 | 0.7 |
| Butylglycol | — | 0.3 | 0.2 | 0.3 |
| Hexylglycol | — | 0.5 | 0.5 | 0.5 |
| Texanol | — | 0.6 | 0.6 | 0.6 |

*The Aqua EC 3500EP paste is a commercially available pigment paste from Axalta. It consists of a grinding resins, pigment and filler, additives and solvents. The paste therefore does not contain any ingredients that significantly influence the cross-linking (either positively or negatively) and is used exclusively for coloring the system, in this case black.

As shown in Table 1, BATH 2, prepared in accordance with an embodiment herein, exhibits the lowest MEQ value, which is beneficial for a low coulombic yield with all the advantages known from electrocoat system with this attribute.

Coatings were deposited from BATHS 1, 2, 6, and 3 for 3 minutes at 34° C. on a same substrate material (phosphated steel sheets commercially available under the mark Bonder 26 s W OC from Chemetal GmbH, Frankfurt, Germany) and were cured under same curing conditions of 18 minutes at 150° C. TABLE 2 provides data from crosslinking tests:

TABLE 2

| | BATH 1 | BATH 2 | BATH 6 | BATH 3 |
|---|---|---|---|---|
| Acetone test 60 seconds | | 130° C. Not OK | 130° C. Not OK | 130° C. Not OK |
| Acetone test 60 seconds | | 140° C. OK | 140°C OK | 140°C OK |
| Acetone test 60 seconds | 150° C. Not OK | 150° C. OK | 150° C. OK | 150° C. OK |

The Acetone test is performed as follows: the lower end of a glass stopper is wetted with acetone and immediately placed on the surface to be tested. The wetted glass stopper is left there for 60 seconds. After this time, the stopper is removed from the surface. After complete evaporation of the acetone still on the surface, the coating is tested for its acetone resistance using an eraser. Specifically the eraser is used to first scratch carefully on the acetone-contaminated area and then immediately on the uncontaminated coating. Then the coating is checked to determine whether there is a difference in the hardness of the acetone-loaded surface region and the unloaded surface region.

As can be seen from Table 2, BATH 2, prepared in accordance with an embodiment herein, exhibits equal cross-linking as compared to the comparative examples of BATH 6 and BATH 3.

Further, testing was performed on exemplary embodiment and reference compositions including pigment and having higher active bismuth catalyst amounts. Specifically, BATH 4 is prepared as BATH 2 from Table 1 is, i.e., with bismuth from the bismuth-sugar solution, but with twice as much active bismuth catalyst (3.2 wt. % active bismuth). Similarly, BATH 5 is prepared as BATH 6 from Table 1 is, i.e., with bismuth from bismuth lactate/dimethylolpropionate complexes, but with twice as much active bismuth catalyst (3.2 wt. % active bismuth).

Coatings were deposited from BATH 4 and 5 for 3 minutes at 34° C. on a same substrate material (phosphated steel sheets commercially available under the mark Bonder 26 s W OC from Chemetal GmbH, Frankfurt, Germany) and were cured under same curing conditions of 18 minutes at 150° C. TABLE 3 provides data from crosslinking tests:

TABLE 3

| | | BATH 4 | BATH 5 |
|---|---|---|---|
| Average Thickness (μm) | 200 V | 15 | 15 |
| Ra-value LT = 5.6 mm (0.800*5) | | 1.088 | 1.482 |
| RZ-value | | 6.135 | 7.894 |
| Rmax-value | | 9.267 | 10.604 |
| Shine 60° | | 31 | 26 |
| Average Thickness (μm) | 240 V | 19 | 20 |
| Ra-value LT = 5.6 mm (0.800*5) | | 1.817 | 1.740 |
| RZ-value | | 9.351 | 9.271 |
| Rmax-value | | 12.818 | 12.921 |
| Shine 60° | | 28 | 24 |
| Average Thickness (μm) | 280 V | 22 | 23 |
| Ra-value LT = 5.6 mm (0.800*5) | | 1.894 | 2.473 |
| RZ-value | | 8.960 | 11.596 |
| Rmax-value | | 13.552 | 15.610 |
| Shine 60° | | 32 | 27 |
| Average Thickness (μm) | 300 V | 24 | 25 |
| Ra-value LT = 5.6 mm (0.800*5) | | 2.370 | 2.097 |
| RZ-value | | 10.792 | 10.105 |
| Rmax-value | | 14.706 | 13.782 |
| Shine 60° | | 27 | 30 |
| Acetone Test 60 seconds | | 130° C. OK | 130° C. OK |

As can be seen from Table 3, BATH 4, prepared in accordance with an embodiment herein, exhibits equal cross-linking as compared to the comparative example of BATH 5 when both have increased active bismuth content of 3.2 wt. % active bismuth.

Further, the stability of Dispersion A (with a solid content of approximately 37 wt %) treated with the bismuth-sugar solution (3.2 wt. % active bismuth) as used in BATH 4 was compared to the stability of Dispersion A treated with bismuth lactate/dimethylolpropionate complexes (3.2 wt. % active bismuth) as used in BATH 5. A sample of each was prepared and stored at ambient temperature and pressure for two weeks. Due to the significantly lower ionic strength the dispersion treated with the bismuth-sugar solution was perfectly stable after two weeks, whereas the dispersion treated with bismuth lactate/dimethylolpropionate complexes showed severe sedimentation after two weeks.

Testing was also performed on exemplary embodiment and reference compositions that are non-pigmented (clear coats) and have higher active bismuth catalyst amounts.

Specifically, BATH 7 is prepared as BATH 2 from Table 1 is, i.e., with bismuth from the bismuth-sugar solution, but with twice as much active bismuth catalyst (3.2 wt. % active bismuth) and without pigment paste. Similarly, BATH 8 is prepared as BATH 6 from Table 1 is, i.e., with bismuth from bismuth lactate/dimethylolpropionate complexes, but with twice as much active bismuth catalyst (3.2 wt. % active bismuth) and without pigment paste.

Coatings were deposited from BATHS 7-8 for 3 minutes at 34° C. on a same substrate material (phosphated steel sheets commercially available under the mark Bonder 26 s W OC from Chemetal GmbH, Frankfurt, Germany) and were cured under same curing conditions of 18 minutes at 150° C.

TABLE 4 provides data from testing BATHS 7 and 8 and data from crosslinking tests:

TABLE 4

| Material | BATH 7 | BATH 8 |
| --- | --- | --- |
| pH at 20° C. | 6.5 | 6.4 |
| Conductivity at 20° C. (μS/cm) | 2120 | 2300 |
| Solids at 30' 180° C. (%) (according to DIN EN ISO 3251) | 32.1 | 31.7 |

TABLE 4-continued

| Material | BATH 7 | BATH 8 |
| --- | --- | --- |
| MEQ-Acid (mmol) | 43.0 | 50.2 |
| Acetone test 60 seconds | 130° C. OK | 130° C. OK |

As shown in Table 4, BATH 7, prepared in accordance with an embodiment herein, exhibits a significantly lower MEQ value as compared to the conventionally prepared BATH 8, such that the difference in MEQ value is clearly seen. Thus, the above-mentioned coloumbic-efficiency is significantly better in the described embodiment than in the comparative standard. This has clear advantages in the separation characteristics that are recognisable to the expert. Further, the clear coats formed by BATHS 7 and 8 showed equal crosslinking according to the acetone test at 130° C.

Coatings were deposited from BATHS 2, 6, and 3 for 3 minutes at 34° C. on a same substrate material (phosphated steel sheets commercially available under the mark Bonder 26 s W OC from Chemetal GmbH, Frankfurt, Germany) and were cured under same curing conditions of 18 minutes at 150° C. Each coating was tested twice. Data regarding corrosion performance and humidity testing is shown in TABLE 5.

TABLE 5

| 504H CH40 after DIN ISO 6270-2 (Corrosion Performance, humidity test) | | | BATH 2 | BATH 2 | BATH 6 | BATH 6 | BATH 3 | BATH 3 |
| --- | --- | --- | --- | --- | --- | --- | --- | --- |
| | Average Film Build | | 24 μm | | 23 μm | | 24 μm | |
| | | A/B | 0.24 | 0.24 | 0.25 | 0.25 | 0.27 | 0.27 |
| Blistering DIN EN ISO 4628-2 | Surface | Ri | 0 | 0 | 0 | 0 | 0 | 0 |
| Cross Hatch DIN EN ISO | Before | | 0 | 0 | 0 | 0 | 0 | 0 |
| | After | | 0 | 0 | 0 | 0 | 0 | 0 |
| Rust formation DIN EN ISO 4628-3 | Surface | Ri | 0 | 0 | 0 | 0 | 0 | 0 |
| Edge corrosion MBN 10494-6 | KR | | 0 | 0 | 0 | 0 | 0 | 0 |
| | | average | 0 | | 0 | | 0 | |
| Delamination | Scratch | average | 0.0 | | 0.0 | | 0.0 | |

As shown above, coatings formed from BATHS 2, 6, and 3 performed substantially equally regarding corrosion performance and humidity testing.

TABLE 6 provides further data related to corrosion performance and humidity testing.

TABLE 6

| 1008 H NSS after DU N ISO 9227 (Corrosion performance, Salt Spray test) | | | BATH 2 | BATH 2 | BATH 6 | BATH 6 | BATH 3 | BATH 3 |
| --- | --- | --- | --- | --- | --- | --- | --- | --- |
| | Average Film Build | | 24 μm | | 23 μm | | 23 μm | |
| | | A/B | 0.24 | 0.24 | 0.25 | 0.25 | 0.27 | 0.27 |
| Blistering DIN EN ISO 4628-2 | Surface | Ri | 0 | 0 | 0 | 0 | 0 | 0 |
| Delamination DIN EN ISO 4628-8 | Scratch | mm | 0.7 | 0.7 | 0.5 | 0.5 | 0.5 | 0.7 |
| Rust formation DIN EN ISO 4628-3 | Surface | Ri | 0 | 0 | 0 | 0 | 0 | 0 |
| Edge corrosion MBN 10494-6 | KR | | 4 | 4 | 3 | 3 | 4 | 4 |
| | | average | 4 | | 3 | | 4 | |
| Delamination | Scratch | average | 0.7 | | 0.5 | | 0.6 | |

As shown above, coatings formed from BATHS 2, 6, and 3 performed substantially equally regarding corrosion performance and humidity testing.

TABLE 7 provides further data related to corrosion performance and humidity testing.

TABLE 7

| 30 cycles VW-WT PV 1210 (Corrosion Performance) | | | | | | | |
|---|---|---|---|---|---|---|---|
| Curing condition: 18' 150° C. Object substrate: 26 S W OC | | | BATH 2 | BATH 2 | BATH 6 | BATH 6 | BATH 3 | BATH 3 |
| | Average Film Build | | 24 μm | | 23 μm | | 23 μm | |
| | | A/B | 0.24 | 0.24 | 0.25 | 0.25 | 0.27 | 0.27 |
| Blistering DIN EN ISO 4628-2 | Surface | Ri | 0 | 0 | 0 | 0 | 0 | 0 |
| Delamination DIN EN ISO 4628-8 | Scratch | mm | 0.6 | 0.7 | 0.7 | 0.6 | 0.5 | 0.6 |
| Rust formation DIN EN ISO 4628-3 | Surface | Ri | 0 | 0 | 0 | 0 | 0 | 0 |
| Edge corrosion MBN 10494-6 | KR | | 4 | 4 | 3 | 3 | 4 | 4 |
| | | average | 4 | | 3 | | 4 | |
| Delamination | Scratch | average | 0.7 | | 0.7 | | 0.6 | |

As shown above, coatings formed from BATHS 2, 6, and 3 performed substantially equally regarding corrosion performance after 30 cycles.

As described herein, a bismuth-sugar solution is used incorporate catalytic bismuth compounds in a cathodic electrocoating composition, and provides the ability to increase bismuth loading without increasing acid loading in the total system. As a result, surface appearance and coating smoothness of coatings electrodeposited from the composition are improved, and the coulombic yield of the electrocoating composition is improved.

Further, embodiments herein provide for acceptable low bake properties and anti-corrosion and are provided with much lower ionic strength—resulting in perfect dispersion stability even if used in very high loading—and much better coloumbic-yield as the bismuth-sugar solution carries much less acid into the system as compared to existing systems. While this could be also accomplished by using powder-like catalyst, the powdered catalyst cannot be incorporated into the resin dispersions. Rather, powdered catalyst must be added into the paste as they have to be milled to achieve particle size suited for electrocoating systems.

Because the bismuth is provided as a liquid solution, embodiments herein allow for addition of the bismuth-sugar solution to the binder resin and/or to the pigment paste when forming pigmented coatings.

As described herein, high loading of bismuth is provided to achieve acceptable low bake properties without harming the stability of the dispersion. This is a result of the low ionic character of the bismuth-sugar solution.

Further, the preparation of the bismuth-sugar solution is less expensive and less time-consuming as compared to convention bismuth lactate/dimethylolpropionate complexes.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. An improved aqueous cathodic electrocoating composition having a binder resin and a crosslinking agent; wherein the improvement is the use of a bismuth-sugar solution to provide a catalytic amount of a bismuth compound dispersed in the electrocoating composition, and wherein:

the electrocoating composition comprises an aqueous dispersion;

the composition is configured to achieve full crosslinking when cured at a low bake temperature of less than 130° C.;

the bismuth compound is bismuth subnitrate;

the bismuth-sugar solution comprises a polyhydroxy compound that is a sugar alcohol;

the bismuth-sugar solution consists essentially of water, bismuth subnitrate, and the sugar alcohol;

the bismuth-sugar solution provides the bismuth compound in an amount of at least 3% by weight based on the weight of the binder resin; and the aqueous dispersion is configured to exhibit stability without sedimentation for at least two weeks at ambient temperature and pressure.

2. The improved aqueous cathodic electrocoating composition of claim 1, wherein:

the sugar alcohol is sorbitol;

the bismuth-sugar solution has a bismuth content of at least 230 g/L;

the bismuth-sugar solution has a pH of 1.5 to 3.0;

the bismuth-sugar solution is a clear solution comprising a water-soluble bismuth-polyhydroxy complex;

the bismuth-sugar solution is free of lactic acid, dimethylolpropionic acid, and amino acids; and the composition is free of bismuth lactate and bismuth dimethylolpropionate.

3. The improved aqueous cathodic electrocoating composition of claim 1, wherein the bismuth-sugar solution has a bismuth content of at least 220 g/L.

4. The improved aqueous cathodic electrocoating composition of claim 1, wherein the bismuth-sugar solution has a bismuth content of at least 240 g/L.

5. The improved aqueous cathodic electrocoating composition of claim 1, wherein the bismuth-sugar solution provides the bismuth compound in an amount of 3%-5% by weight, based on the weight of the binder resin.

6. The improved aqueous cathodic electrocoating composition of claim 1, wherein the bismuth-sugar solution provides the bismuth compound in an amount of 3%-4% by weight, based on the weight of the binder resin.

7. The improved aqueous cathodic electrocoating composition of claim 1, wherein the binder resin is an epoxy amine adduct that is the reaction product of a polyepoxide resin and an amine selected from the group consisting of diethanolamine, N-methylethanolamine, N-phenylethanolamine, and combinations thereof; and the crosslinking agent is a blocked polyisocyanate selected from the group consisting of blocked hexamethylene diisocyanate, blocked cyclohexamethylene diisocyanate, blocked toluene diisocyanate, blocked methylene diphenyl diisocyanate, and combinations thereof.

8. The improved aqueous cathodic electrocoating composition of claim 1, wherein the composition is free of any catalyst other than the bismuth compound.

9. The improved aqueous cathodic electrocoating composition of claim 1 further comprising at least one pigment selected from the group consisting of titanium dioxide, carbon black, iron oxide, clay, and combinations thereof, wherein the pigment to binder weight ratio is from 0.2:1 to 0.4:1.

10. The improved aqueous cathodic electrocoating composition of claim 1, wherein the aqueous cathodic electrocoating composition is free of pigment.

11. The improved aqueous cathodic electrocoating composition of claim 10, wherein the composition has an MEQ-acid value of less than 40 mmol 44 mmol per 100 g of resin solid content.

12. The improved aqueous cathodic electrocoating composition of claim 1, wherein:

the sugar alcohol is selected from the group consisting of dulcitol, sorbitol, xylitol, mannitol, and combinations thereof;

the bismuth-sugar solution has a pH of from 1.0 to 4.0;

the bismuth-sugar solution has a density of from 1.0 g/mL to 2.0 g/mL;

the binder resin is an epoxy amine adduct that is a reaction product of a polyglycidyl ether of bisphenol A and diethanolamine; and the crosslinking agent is a blocked polyisocyanate.

13. The improved aqueous cathodic electrocoating composition of claim 1, wherein the aqueous dispersion has an average particle size diameter of the binder phase of from 0.1 to 10 microns.

14. The improved aqueous cathodic electrocoating composition of claim 1, further comprising at least one additive selected from the group consisting of wetting agents, surfactants, defoamers, light stabilizers, anti-crater agents, flow aids, dispersion stabilizers, adhesion promoters, corrosion inhibitors, and combinations thereof.

15. The improved aqueous cathodic electrocoating composition of claim 1, wherein the composition has a solids content of from 10 to 30 percent by weight when formulated as an electrocoating bath.

16. The improved aqueous cathodic electrocoating composition of claim 1, wherein the composition has an MEQ-acid value of less than 39 mmol per 100 g of resin solid content; and the composition has an electrical conductivity of less than 1500 $\mu$S/cm at 20° C.

17. The improved aqueous cathodic electrocoating composition of claim 1, wherein curing at the low bake temperature of less than 130° C. comprises curing at no more than 120° C.

18. The improved aqueous cathodic electrocoating composition of claim 1, wherein the sugar alcohol is sorbitol.

19. The improved aqueous cathodic electrocoating composition of claim 1, wherein the bismuth-sugar solution has a pH of from 1.5 to 2.5 and a density of from 1.3 g/mL to 1.5 g/mL.

20. The improved aqueous cathodic electrocoating composition of claim 1, wherein;

the composition is free of bismuth lactate and bismuth dimethylolpropionate; and the composition has an MEQ-acid value of less than 39 mmol per 100 g of resin solid content.

\* \* \* \* \*